(12) United States Patent (10) Patent No.: US 8,045,052 B2
Nusseck et al. (45) Date of Patent: Oct. 25, 2011

(54) IMAGE PROCESSING DEVICE AND ASSOCIATED OPERATING METHOD

(75) Inventors: Hans-Guenther Nusseck, Tuebingen (DE); Heinrich H. Buelthoff, Tuebingen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 1202 days.

(21) Appl. No.: 11/574,458

(22) PCT Filed: Aug. 31, 2005

(86) PCT No.: PCT/EP2005/054282
§ 371 (c)(1),
(2), (4) Date: Apr. 10, 2007

(87) PCT Pub. No.: WO2006/024646
PCT Pub. Date: Mar. 9, 2006

(65) Prior Publication Data
US 2009/0040394 A1 Feb. 12, 2009

(30) Foreign Application Priority Data
Aug. 31, 2004 (DE) .......................... 10 2004 042 166

(51) Int. Cl.
*H04N 5/66* (2006.01)
*H04N 17/02* (2006.01)
*H04N 11/04* (2006.01)
*H04N 11/02* (2006.01)
(52) U.S. Cl. ..... 348/383; 348/185; 348/194; 348/388.1; 348/425.4
(58) Field of Classification Search .................... 348/744
See application file for complete search history.

(56) References Cited

U.S. PATENT DOCUMENTS 5,057,910 A * 10/1991 Judge ............................ 348/180
(Continued)

FOREIGN PATENT DOCUMENTS

DE 228136 A1 10/1985
(Continued)

OTHER PUBLICATIONS

Allard et al., "Net Juggler and SoftGenLock: Running VR Juggler with Active Sterio and Multiple Displays on a Commodity Component Cluster", IEEE Computer Society (2002).

(Continued)

*Primary Examiner* — Jefferey Harold
(74) *Attorney, Agent, or Firm* — Caesar, Rivise, Bernstein, Cohen & Pokotilow, Ltd.

(57) ABSTRACT

The invention relates to an image processing device (1, 48, 51) including: several image signal inputs (2-9) for receiving a respective image input signal, the signals being unsynchronized; at least one image signal output (23-26) for emitting at least one image output signal; a combiner (22) for combining the different image input signals to form the image output signal; several synchronizers (14-21), which are respectively connected downstream of the image signal inputs (2-9) and which synchronize the unsynchronized image input signals; and several distorters or rectifiers for distorting or rectifying the individual image input signals before they are combined to form the image output signal. According to the invention, the distorters or rectifiers are formed by the individual synchronizers (14-21) and the image input signals are distorted or rectified independently of one another by one or more synchronizers (14-21). The invention also relates to an associated operating method.

25 Claims, 7 Drawing Sheets

U.S. PATENT DOCUMENTS

| | | | |
|---|---|---|---|
| 5,136,390 A | | 8/1992 | Inova et al. |
| 5,499,375 A | * | 3/1996 | Miyaguchi ..................... 712/2 |
| 5,550,594 A | * | 8/1996 | Cooper et al. ................ 348/513 |
| 5,760,729 A | * | 6/1998 | Rumreich ..................... 341/159 |
| 6,456,737 B1 | * | 9/2002 | Woodfill et al. .............. 382/154 |
| 7,167,191 B2 | * | 1/2007 | Hull et al. ..................... 715/748 |
| 2002/0015055 A1 | * | 2/2002 | Foran ........................... 345/679 |
| 2003/0038807 A1 | | 2/2003 | Demos et al. |
| 2003/0149987 A1 | | 8/2003 | Pasqualino et al. |
| 2003/0179740 A1 | | 9/2003 | Baina et al. |
| 2003/0222987 A1 | * | 12/2003 | Karazuba ................. 348/207.99 |
| 2004/0131276 A1 | * | 7/2004 | Hudson ........................ 382/276 |
| 2004/0252241 A1 | | 12/2004 | Paulsen |

FOREIGN PATENT DOCUMENTS

| | | |
|---|---|---|
| DE | 10314105 A1 | 1/2004 |
| EP | 1427197 A1 | 6/2004 |
| WO | 2002104009 A1 | 12/2002 |
| WO | 2004057529 A2 | 7/2004 |

OTHER PUBLICATIONS

Anonymous, "Ausbildunghshandbuch audiovisuelle Medienberufe" pp. 344-411 (2003).

Colin, "Anyplace Projection", Projector Central (May 4, 2004).

Meyer-Schwarzenberger, "Lexikon Video-, Audio-, und Netztechnik", p. 117 (2004).

Li et al., "Building and Using a Scalable Display Wall System", IEEE Computer Graphics and Applications, pp. 29-37 (2000).

LYNX Technik AG, "Series 3000 MiniModules Product Catalog", pp. 1-11 (2003).

Schmidt, "Professionelle Videotechnik", pp. 428-505 (2000).

Shawky et al., "A Computing Platform and its Tools for Features Extraction from On-Vehicle Image Sequences", IEEE Intelligent Transportation Systems, pp. 39-45 (2000).

International Search Report for PCT/EP2005/054282.

* cited by examiner

IMAGE PROCESSING DEVICE AND ASSOCIATED OPERATING METHOD

BACKGROUND OF THE INVENTION

The invention relates to an image processing device and to an associated operating method.

In video systems and digital graphics systems, often different graphics signals have to be combined with one another to form a single graphics signal. This is the case for example when an object has been recorded in front of a so-called blue screen and must subsequently be blended into a background image, which has been recorded separately and is provided as a separate graphics signal.

Furthermore, it is known to perform geometry correction when combining a plurality of different graphics signals. This may be useful for example when the combined graphics signal is projected onto a curved projection surface or else in order to compensate any optical errors of the visualization device. In order to prevent a distorted image impression, the combined graphics signal may then be distorted in order to compensate the curvature of the projection surface.

It is also known to perform brightness or color correction when projecting or displaying graphics signals. This is useful for example when a plurality of projectors or screens is to generate a uniform overall image. In order to prevent different color rendering, the graphics signals may be distorted in terms of their color or brightness values so as to compensate any differences between the visualization devices.

However, one disadvantage of the known graphics systems for combining different graphics signals is the fact that they receive synchronized graphics signals on the input side. In practice, however, the graphics signals to be combined with one another are often asynchronous, which makes it more difficult to combine them using the known graphics systems or requires specially synchronized graphics systems.

Ulrich Schmidt: "Professionelle Videotechnik", Springer-Verlag (2000), page 483, FIG. 8.71 discloses an image processing device, which can receive different, unsynchronized image input signals on the input side and only then synchronizes them, whereupon the synchronized image input signals are then combined by means of a combiner to form an image output signal. This known image processing device therefore advantageously makes it possible to combine unsynchronized image input signals.

The use of so-called frame synchronizers for synchronizing unsynchronized image input signals is also known for example from "Ausbildungshandbuch audiovisuelle Medienberufe", Vol. 2, Hüthig-Verlag (2003), Section 4.2.1.14, pages 360-361.

Further image processing devices are known from:
Shawky, M.; Bonnet, S.; Favad, S.; Crubille, P.: "A Computing Platform and its Tools for Feature Extraction from On-Vehicle Image Sequences", IEEE Intelligent Transportation Systems Conference, 2000, Dearborn, Mich., USA, 1-3 Oct. 2000, Conference Proceedings, pp. 39-45.
DE 103 14 105 A1
DD 228 136 A1
LYNX Technik AG: "Series 3000 MiniModules. Product Catalog", company publication, S3000MM Ver 1.0., Weiterstadt: LYNX, 2003
LI, Kai; CHEN, Han; CHEN, Yuqun et al.: "Building and Using a Scalable Display Wall System", IEEE Computer Graphics and Applications, Vol. 20, No. 4, July/August 2000, pp. 29-37.
ALLARD, Jeremie; GOURANTON, Valerie; LECOINTRE, Loick et al.: "Neff Juggler and SoftGenLock: Running VR Juggler with Active Stereo and Multiple Displays on a Commodity Computer Cluster", IEEE Virtual Reality Conference 2002, VR'02, Orlando, Fla., USA, 24-28 Mar. 2002.

However, one disadvantage with the above-described known image processing devices is the unsatisfactory image quality when a plurality of unsynchronized image input signals are combined with one another and then geometrically distorted or rectified.

The task of the invention is therefore to provide an image processing device and an associated operating method which gives an improved image quality when combining a plurality of image input signals and carrying out geometric distortion or rectification.

This task is solved by the features of the invention.

SUMMARY OF THE INVENTION

The invention comprises an image processing device comprising a plurality of image signal inputs for receiving a respective image input signal, wherein the individual image input signals usually represent an image or a sequence of images.

The invention is not restricted to a specific number of image signal inputs, but the image processing device according to the invention preferably has eight image signal inputs so that a total of eight different image input signals can be received. However, the invention can also be implemented with a different number of image signal inputs, for example with two, four, six or more image signal inputs.

Furthermore, the image processing device according to the invention preferably has at least one image signal output for outputting an image output signal, wherein the image output signal usually represents an image or a sequence of images.

With regard to the number of image signal outputs, the invention is also not restricted to a single image signal output. Rather, it is also possible to provide a plurality of image signal outputs so as to output a corresponding number of image output signals. The individual image output signals may in this case represent different images or sequences of images. Furthermore, it is also possible that the different image signal outputs output image output signals in different data formats, wherein the different image output signals may then represent the same image or the same sequence of images. It is, e.g., possible that one image signal output outputs a digital image output signal, whereas another image signal output of the image processing device according to the invention outputs an analogue image output signal.

Furthermore, the image processing device according to the invention preferably comprises a combiner for combining the different image input signals with one another to form the image output signal or to form the individual image output signals.

The image processing device according to the invention makes it possible to receive unsynchronized image input signals, so that a synchronizer is respectively connected downstream of the individual image signal inputs, which synchronizer synchronizes the unsynchronized image input signals for the subsequent combining operation.

The combiner of the image processing device according to the invention preferably includes a programmable or configurable combinational circuit, which combines the different image input signals with one another in accordance with predefined (preferably variable) programming to form the image output signal and which can be programmed or configured via a serial and/or parallel programming interface. The combining of the different image input signals can therefore be set at the pixel level by means of corresponding programming of the programmable combinational circuit, so that any combinations of the image input signals received on the input side are possible.

The programmable combinational circuit for combining the different image input signals preferably has an FPGA (Field Programmable Gate Array), but it is in principle also possible that the combiner in the image processing device according to the invention has a PLD (Programmable Logic Device) or a PAL (Programmable Array Logic). For example, an FPGA available from the company XILINX may be used as the combiner, although the invention is not restricted to this type of FPGA as combiner. Nevertheless, the use of FPGAs of the Virtex II Pro X or Virtex IV type from the company XILINX is particularly advantageous.

The combiner of the image processing device according to the invention is preferably connected to a random access memory, the content of which defines the combination of the image input signals. This may be for example a DDR-RAM which may have for example a storage capacity of 128 MBit.

Within the context of the invention, it is also possible that the combiner is connected to a read-only memory which contains a start configuration for the combiner, wherein the start configuration is loaded into the combiner at the time of switch-on. This read-only memory may be for example a JTAG Flash memory, but the invention is not restricted to this type of memory with regard to the type of memory for the read-only memory for storing the start configuration.

In one preferred example of embodiment of the invention, the image processing device has at least one signal splitter which is connected on the input side to at least one of the image signal inputs and on the output side to at least two of the synchronizers, wherein the signal splitter splits the image input signal applied on the input side between the synchronizers connected to the signal splitter on the output side. This splitting of an image input signal between a plurality of synchronizers may be useful in order to circumvent bandwidth limitations of the synchronizers and to process image input signals with very high bandwidth requirements, as a plurality of synchronizers jointly synchronize and distort one image input signal, wherein the synchronized subsignals are then appropriately recombined by the combiner. In the preferred example of embodiment, the signal splitter receives a respective image input signal on the input side and splits it between two synchronizers, where said signal is synchronized and corrected. However, the invention is not restricted to a splitting ratio of 1:2 but rather can also be implemented with other splitting ratios, for example a splitting ratio of 1:3, 1:4 or more, if the bandwidth limitation of the synchronizers and the bandwidth of the image input signals make this necessary.

The signal splitters can preferably be programmed so as, depending on the programming, either to feed each image input signal to a respective one of the synchronizers or to split the individual image input signals in each case between a plurality of the synchronizers. In this case, the image processing device according to the invention therefore has at least two operating modes, wherein the signal splitters are inactive in one operating mode and are switched to the active state in another operating mode in order to split the respective individual image input signals between a plurality of the synchronizers.

Preferably, a signal splitter is connected downstream of respective pairs of individual image signal inputs, wherein the individual signal splitters can preferably be programmed individually. It is then possible that one signal splitter of the image processing device according to the invention is switched to the inactive state while another signal splitter of the image processing device according to the invention is switched to the active state.

It should furthermore be mentioned that the image processing device according to the invention preferably comprises a central clock generator which is connected on the output side to all the synchronizers. This makes it possible for the individual image input signals to be synchronized by the individual synchronizers independently of their frequency and resolution, so that the signals provided at the outputs of the synchronizers are synchronized down to pixel level.

The image processing device according to the invention may further comprise an external synchronization terminal for synchronizing the image processing device with other image processing devices.

The image processing device according to the invention further includes at least one distorter or rectifier for respectively individually distorting or rectifying the individual image input signals before they are combined to form the image output signal. Here, the distorter or rectifier is formed by the individual synchronizers, which therefore have two functions, namely on the one hand the synchronization of the image input signals and on the other hand the distortion or rectification thereof. This is provided for example by the chip type sxT1 from the company Silicon Optix, which also has the name "Reon". However, with regard to the synchronization, the invention is not restricted to chips of this type but rather can also in principle be implemented with other types of chip. However, the synchronizers are preferably bifunctional in that they allow not only the synchronization of the input signals but also the distortion or rectification thereof.

The modules referred to as synchronizers within the context of this description may also be referred to as correction modules due to the fact that they are bifunctional, wherein the correction modules or synchronizers offer the following advantages.

Firstly, the grouping-together of a plurality of correction modules or synchronizers by using a single clock generator allows the synchronization of different inputs. Secondly, each correction module or synchronizer can correct different resolutions or clock rates of the image signal inputs, so that a uniform image signal is output at the output of each correction module or synchronizer and is passed on to the combiner.

Furthermore, the individual correction modules or synchronizers can correct the respective image signal individually with regard to geometry and/or brightness and/or color.

Finally, the individual correction modules or synchronizers can individually chop and change the size of (enlarge and reduce) the respective image signal, as a result of which just part of the respective image signal is passed on to the combiner.

The term "distortion or rectification" of image signals which is used within the context of the invention is therefore meant in the geometrical sense and not in the telecommunications sense and encompasses, in addition to the geometric correction of the image content, also the correction of the brightness and of the color information.

It should also be mentioned that the individual synchronizers preferably in each case have a control input, via which a change of image can be triggered, wherein the control inputs of the individual synchronizers are preferably jointly connected to the combiner in order to receive a common trigger signal from the combiner. This joint triggering of the individual synchronizers by the combiner permits a synchronous change of image, which is usually a prerequisite for the subsequent combining operation.

Moreover, the individual synchronizers can preferably be configured via a respective configuration input, wherein the individual configuration inputs of the synchronizers are connected to the combiner via a multiplexer. The combiner can in this case address and configure all the synchronizers via the multiplexer.

It should also be mentioned that the image processing device according to the invention is preferably integrated on a single chip or at least on a single printed circuit board.

Furthermore, the image signal output of the image processing device may be connected to an image display device, such as a projector or a monitor for example.

One advantageous field of application of the image processing device according to the invention consists in the split image calculation in a plurality of nodes of a graphics cluster, if the calculation capacity of the individual nodes alone is not sufficient. Here, the image calculation is split between a plurality of graphics computers such that each processes just part of the image. The coordination of this parallel image calculation may be carried out for example by a control computer. The subsignals processed by the individual graphics computers are then fed to the image signal inputs of the image processing device according to the invention, synchronized and subsequently recombined.

The invention also comprises an operating method for an image processing device according to the invention, as is already clear from the above description.

BRIEF DESCRIPTION OF SEVERAL VIEWS OF THE DRAWINGS

Other advantageous further developments of the invention are characterized in the dependent claims or will be explained in more detail below together with the description of the preferred examples of embodiments of the invention which is given with reference to the figures, in which:

DETAILED DESCRIPTION OF PREFERRED EMBODIMENTS

Figure 1:
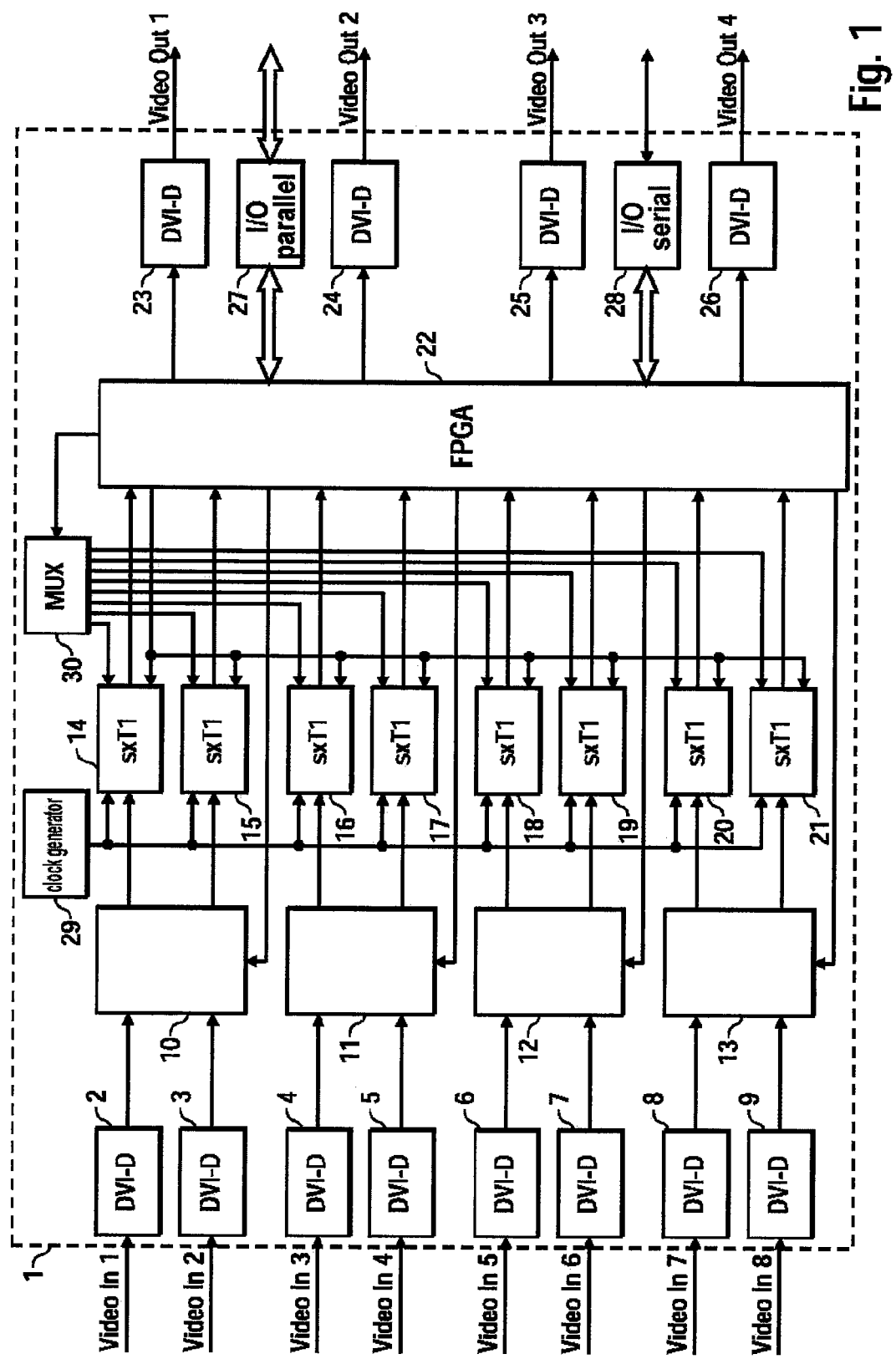
FIG. 1 shows a simplified block diagram of an image processing device according to the invention for combining eight image input signals to form four image output signals.

The simplified block diagram in FIG. 1 shows an example of embodiment of an image processing device 1 according to the invention for combining eight unsynchronized image input signals Video In 1, ..., Video In 8 to form four image output signals Video Out 1, ..., Video Out 4.

In order to receive the individual unsynchronized image input signals Video In 1, ..., Video In 8, the image processing device 1 has a plurality of digital input interfaces 2-9 (DVI-D: Digital Video Interface). Here, the individual pixel information items are in each case transmitted in the form of an 8-bit value, wherein the image value for the primary colors red, yellow and blue are transmitted in parallel for each pixel.

The individual input interfaces 2-9 are in each case connected in pairs on the output side to a plurality of signal splitters 10-13, the structure of which is shown in more detail in FIG. 2 and will be described in more detail below.

On the output side, the individual signal splitters 10-13 are connected to eight synchronizers 14-21, which in each case receive two image signals from the individual signal splitters 10-13 and synchronize said signals. In this example of embodiment, the synchronizers 14-21 are chips of the type sxT1 from the company Silicon Optix, which are also referred to as "Reon".

The image signals synchronized by the synchronizers 14-21 are then fed to a combiner 22, which is an FPGA (Field Programmable Gate Array) of the type Virtex-II from the company XILINX. The combiner 22 combines the image signals received on the input side in accordance with predefined programming (not shown here) to form the image output signals Video Out 1, ..., Video Out 4, and outputs these signals at a plurality of output interfaces 23-26.

The image processing device 1 further has a parallel interface 27 and a serial interface 28 for configuring the image processing device 1.

The image processing device 1 also has a central clock generator 29 which is connected on the output side to the synchronizers 14-21. This common clocking of the individual synchronizers 14-21 makes it possible for the image input signals Video In 1, ..., Video In 8 to be synchronized independently of their frequency and resolution, so that the signals provided at the outputs of the synchronizers 14-21 are synchronized down to pixel level.

Furthermore, the combiner 22 is connected to the individual synchronizers 14-21 via a multiplexer 30, so as to configure the synchronizers individually.

Moreover, the combiner 22 is connected to the individual signal splitters 10-13 in order to be able to switch them between two operating modes. In one operating mode, the signal splitters 10-13 are inactive, so that the two respective image input signals applied on the input side are switched through to the associated synchronizers. On the other hand, in another operating mode, the signal splitters 10-13 are switched to the active state, so that only the image input signal applied to one of the two signal inputs is split between the two synchronizers connected on the output side. In this operating mode, it is also possible to process image input signals having a bandwidth greater than the maximum processing bandwidth of the synchronizers 14-21.

Hereinbelow, the structure and functioning of the signal splitter 10 will be described in more detail with reference to FIG. 2, wherein the other signal splitters 11-13 have the same structure.

On the input side, the signal splitter 10 has two TMDS receivers 31, 32 which are connected on the input side to the two input interfaces 2, 3 and generate an RGB signal having a width of 48 bits.

The TMDS receiver 32 in one of the two parallel branches can be switched to the inactive state by the combiner 22 via a control line 33 and an inverter 34, so that the TMDS receiver 32 does not output an image signal.

An amplifier 35 is moreover arranged between the two signal processing branches, which amplifier can pass the image signal output by the TMDS receiver 31 to the synchronizer 15 of the other signal processing branch. The amplifier 35 can in this case also be switched to the inactive state by the combiner 22 via the control line 33, the inverter 34 and a further inverter 36. The two inverters 34, 36 thus ensure that either the TMDS receiver 32 or the amplifier 35 is switched to the active state. This means that, depending on the actuation via the control line 33, either the two image input signals Video In 1, Video In 2 received on the input side are passed to the downstream synchronizers 14, 15 without any further modification or else only the image input signal Video In 1 received on the input side is split and distributed between the two synchronizers 14, 15.

This splitting of the image input signals received on the input side makes it possible to circumvent bandwidth limitations of the synchronizers 14-21 and to process image input signals of higher bandwidth.

Figure 3:
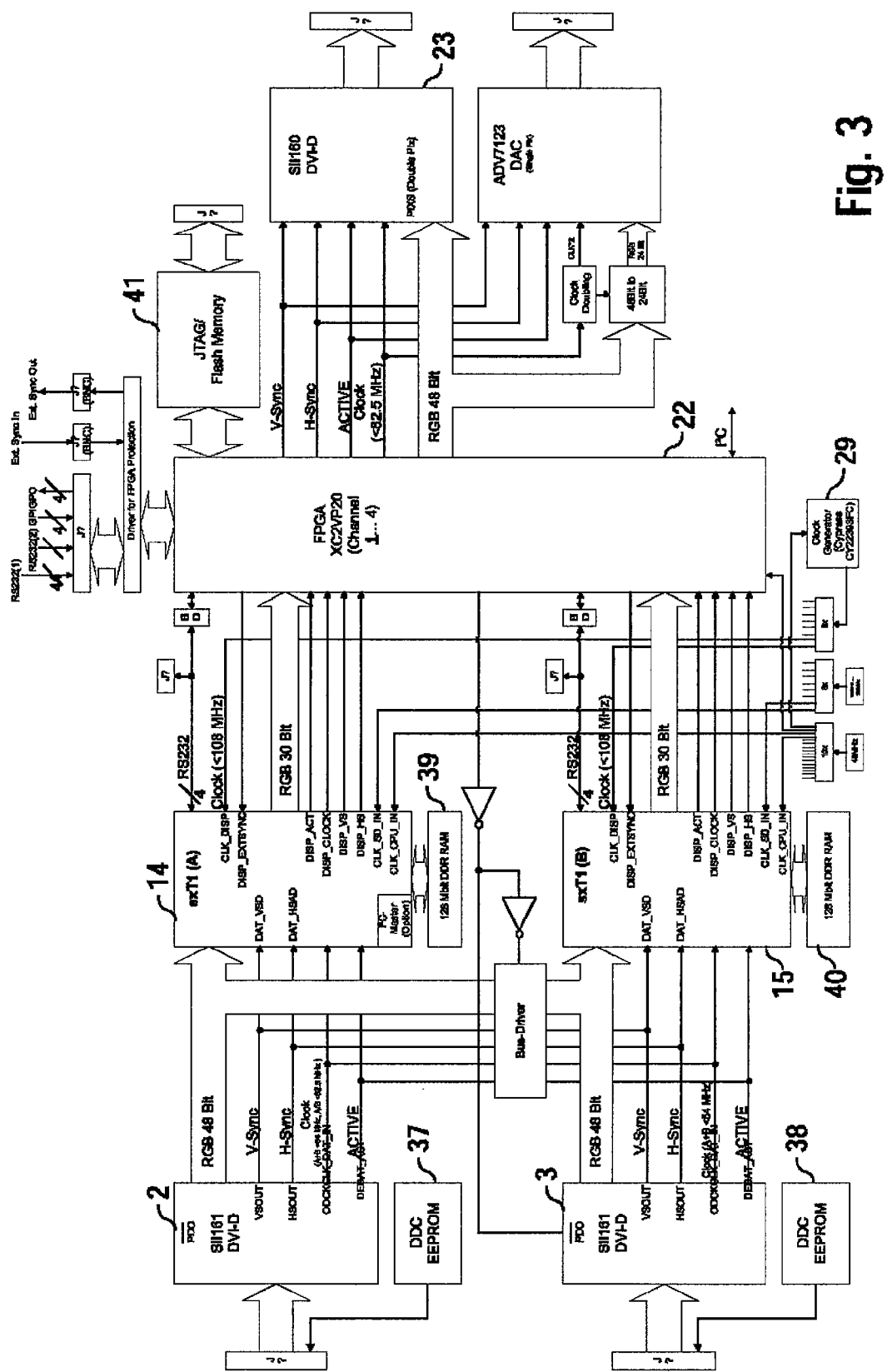
FIG. 3 shows a more detailed block diagram of part of the image processing device of FIG. 1.

Hereinbelow, the detailed example of embodiment shown in FIG. 3 will be briefly described, wherein for the sake of simplification just part of the image processing device 1 comprising the input interfaces 2, 3 is shown.

Figure 2:
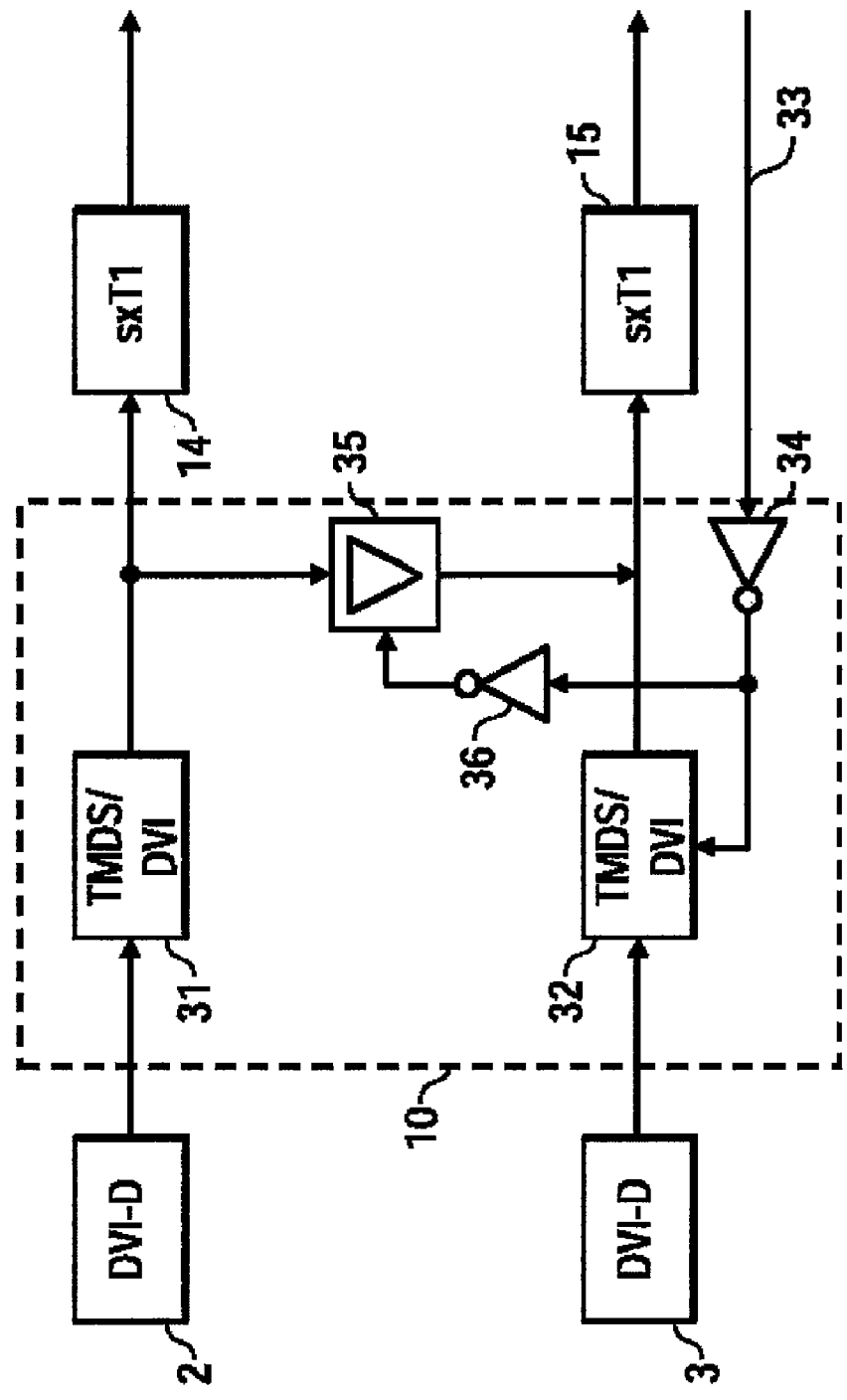
FIG. 2 shows the signal splitter of the image processing device of FIG. 1.

For the sake of simplification, the same references are used here as in FIGS. 1 and 2, wherein reference is largely made to the above description in order to avoid repetitions.

It can further be seen from this block diagram that each input interface 2, 3 has a respective DDC-EEPROM 37, 38 which provides a DDC string.

Moreover, each of the synchronizers 14, 15 is connected to a random access memory 39, 40, in which the image data are buffer-stored.

The combiner 22 is also connected to a memory 41, in which the start configuration for the combiner 22 is stored, wherein the start configuration is loaded into the combiner 22 from the memory 41 at the time of switch-on. Here, the memory 41 is a JTAG Flash memory.

Figure 4:
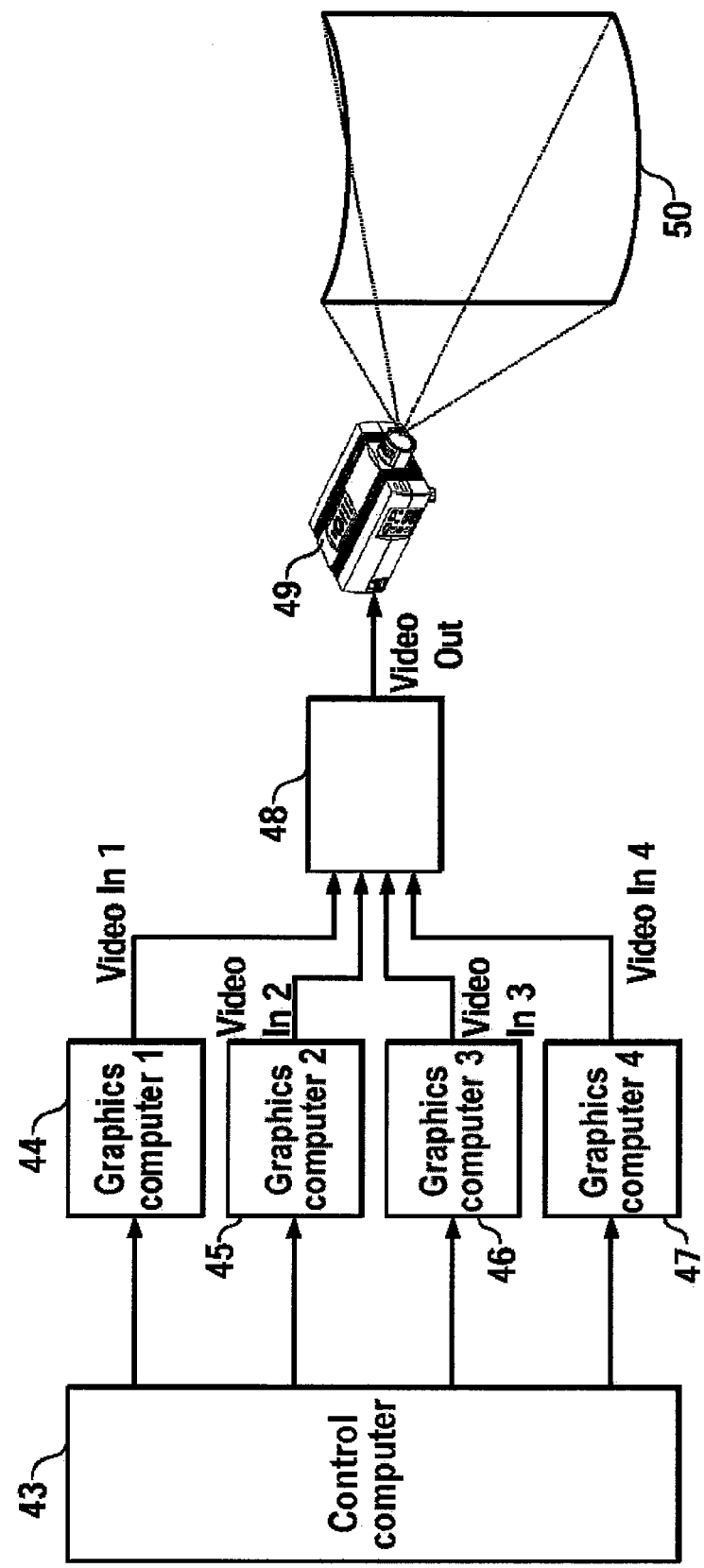
FIG. 4 shows a graphics system according to the invention comprising a graphics cluster for the parallel processing of graphics signals.

Hereinbelow, the example of embodiment of a graphics system according to the invention which is shown in FIG. 4 will be described.

Here, a plurality of graphics computers 44-47 calculates respective image sections of a high-resolution image. A control computer 43 carries out the coordination of the image calculation on the individual graphics computers 44-47. Due to the fact that the image signal to be processed is split in this way between a plurality of graphics computers 44-47, it is possible to achieve a high processing capacity using simple graphics computers.

On the output side, the individual graphics computers 44-47 are connected to an image processing device 48 according to the invention, which synchronizes and combines the unsynchronized output signals of the individual graphics computers 44-47 so that a combined image output signal Video Out is provided at the output of the image processing device 48.

This image output signal Video Out is fed to a projector 49, which projects an image onto a curved projection surface 50. The curvature of the projection surface 50 is compensated here by a complementary distortion in the synchronizers of the image processing device 48, so that the image on the projection surface 50 appears to be undistorted despite the curvature of the projection surface 50.

Figure 5:
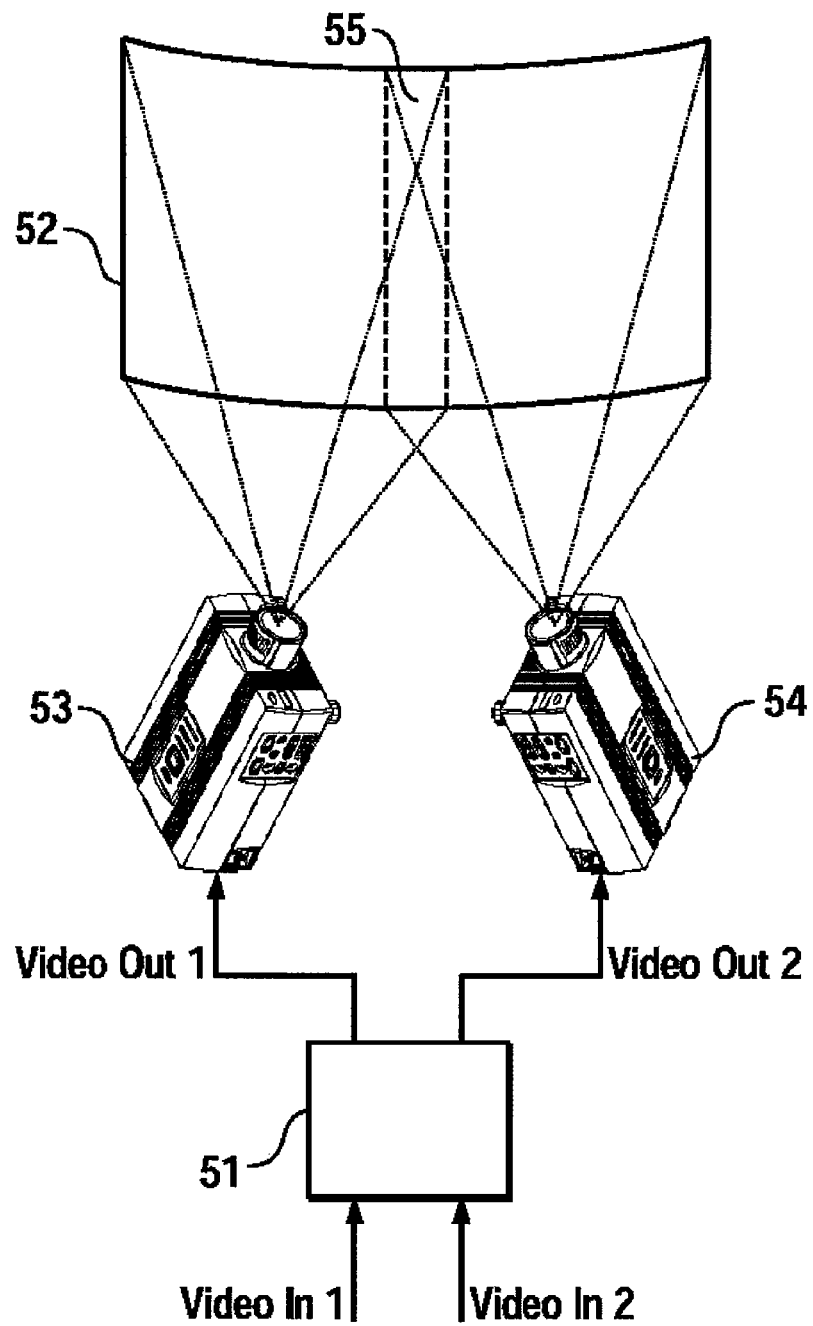
FIG. 5 shows a graphics system for projecting image signals.

Hereinbelow, the example of embodiment of a graphics system according to the invention which is shown in FIG. 5 will be described, in which two image input signals Video In 1, Video In 2 are fed to an image processing device 51 according to the invention, which geometrically distorts the image input signals Video In 1, Video In 2 in order to compensate the curvature of a projection surface 52, and also corrects the brightness and color so as to compensate any differences between the projectors 53, 54.

On the output side, the image processing device 51 is connected to two projectors 53, 54, which project the two image output signals Video Out 1, Video Out 2 onto the projection surface 52.

Here, the two images projected by the projectors 53 and 54 overlap in an overlap area 55 on the projection surface 52. The image processing device makes it possible to carry out a brightness correction for the image signals in this area, which permits so-called "edge blending".

Figure 6:
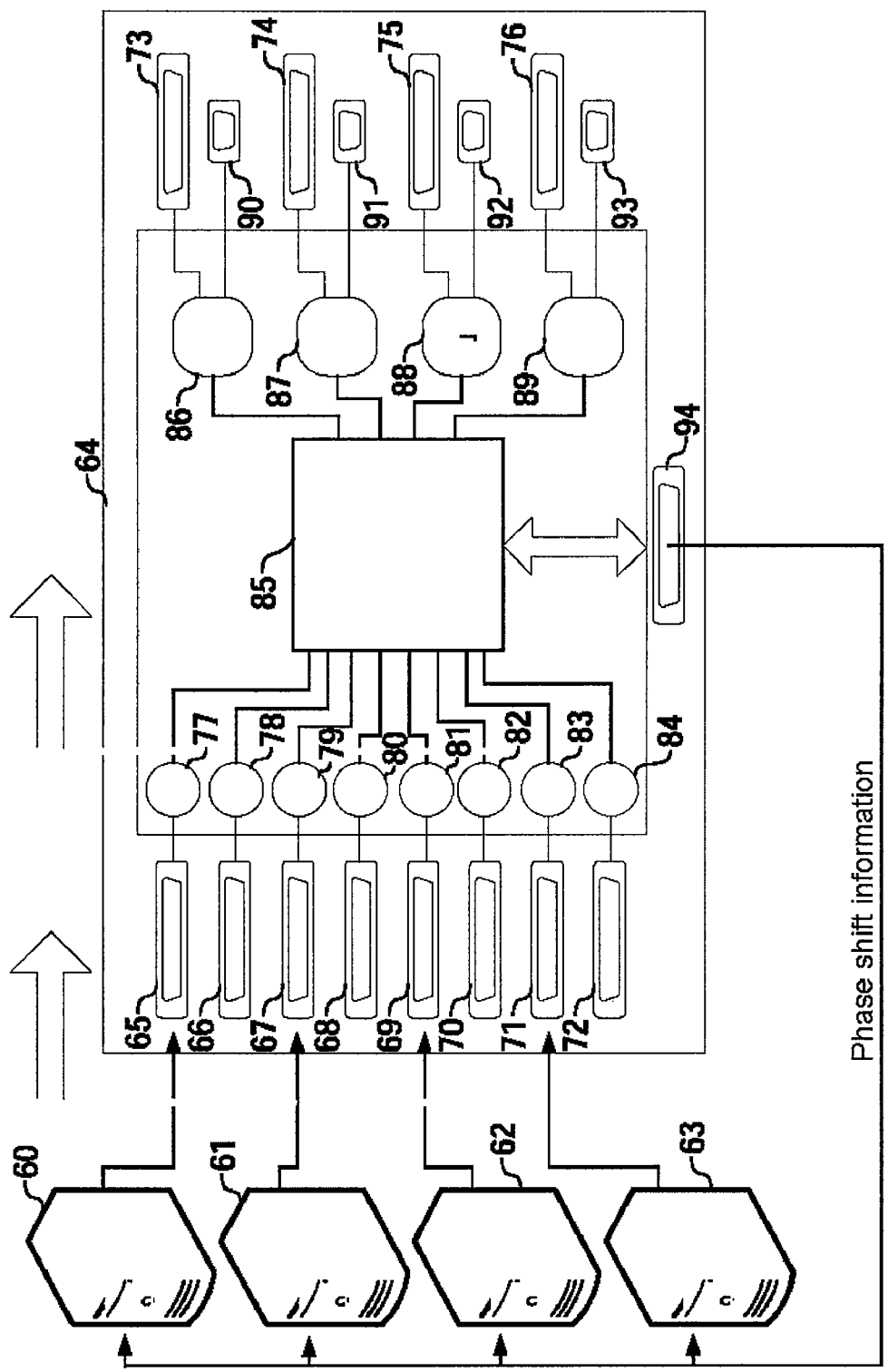
FIG. 6 shows a simplified block diagram of an image processing system according to the invention comprising a plurality of graphics computers as image signal sources and the image processing device according to the invention for combining these image input signals.

FIG. 6 shows a simplified block diagram of an image processing system according to the invention comprising a plurality of graphics computers 60, 61, 62, 63 which each supply an image input signal, wherein the image input signals provided by the graphics computers 60-63 are unsynchronized.

Furthermore, the illustrated image processing system has an image processing device 64 according to the invention comprising a plurality of image signal inputs 65-72 and a plurality of image signal outputs 73-76. The image signal inputs 65-72 are supplied with the unsynchronized image input signals from the graphics computers 60-63.

A respective so-called WARP chip 77-84 is connected downstream of the individual image signal inputs 65-72 in the image processing device 64, wherein said chip is in each case essentially a synchronizer which synchronizes the unsynchronized image input signals received on the input side with one another.

On the output side, the WARP chips 77-84 are connected to a combiner 85 in the form of an FPGA.

The combiner 85 is in turn connected on the output side to the image signal outputs 73-76 via a plurality of TMDS transmitters 86-89.

Furthermore, the image processing device 64 in this example of embodiment also has a plurality of analogue output interfaces 90-93.

However, it is particularly important here that the phase difference between the image input signals received from the graphics computers 60-63 is determined in the image processing device 64 and coupled back to the graphics computers 60-63 via an interface 94. The graphics computers 60-63 then carry out rough synchronization of the image input signals fed into the image processing device 64, so that the image processing device 64 then has to perform only fine synchronization of the image input signals.

The image processing device 64 has a possibility for synchronization which can synchronize the image signals down to the pixel level ("GENLOCK"), so that the image input signals received via the image signal inputs 65-72 need not be provided in a synchronous manner down to the pixel level. However, in order to keep the latency of the image processing device 64 as low as possible, it is useful if the image input signals are provided in a manner such that they are already roughly synchronized. The only important thing here is that the time of the respective image start ("FRAMESYNC") is phase-shifted by no more than 5-10° relative to the other image input signals ("FRAMELOCK"). The exact synchronization of the image input signals ("GENLOCK") is then carried out by the WARP chips 77-84 of the image processing device 64.

Figure 7A:
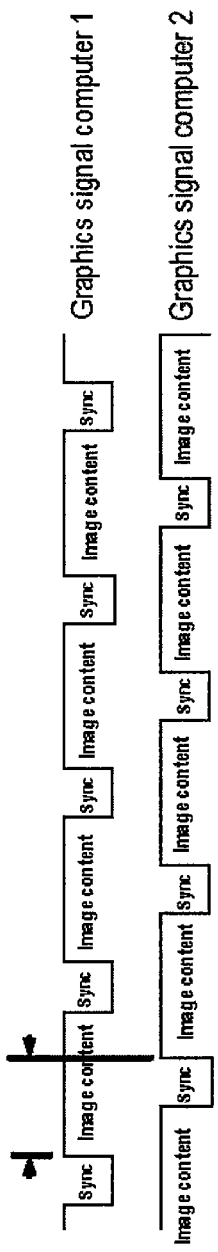
FIGS. 7A, 7B show a timing diagram which illustrates the rough synchronization of the image input signals in the graphics computers of the image processing system shown in FIG. 6.
Figure 7B:
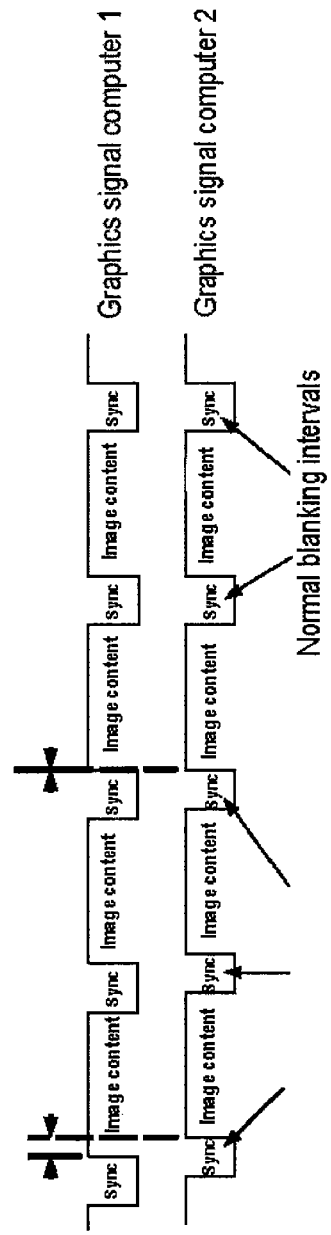

The rough synchronization of the image input signals fed into the image processing device 64 may be implemented in the graphics computers 60-63 by a software routine which increases or reduces the length of the vertical blanking interval of the image signals, as can be seen from the timing diagrams in FIGS. 7A and 7B. All that is required for this is the information concerning the actual phase shift of the image input signals, which is provided by the image processing device 64 via the interface 94.

The invention is not restricted to the preferred examples of embodiments described above. Rather, a large number of variants and modifications are possible which likewise make use of the inventive concept and therefore fall within the scope of protection.

LIST OF REFERENCES

1 image processing device
2-9 input interfaces
10-13 signal splitters
14-21 synchronizers
22 combiner
23-26 output interfaces
27 parallel interface
28 serial interface
29 clock generator
30 multiplexer
31 TMDS receiver
32 TMDS receiver
33 control line
34 inverter
35 amplifier
36 inverter
37 DDC-EEPROM
38 DDC-EEPROM
39 random access memory
40 random access memory
41 memory
42 --
43 control computer
44-47 graphics computers
48 image processing device
49 projector
50 projection surface
51 image processing device
52 projection surface
53 projector
54 projector
60-63 graphics computers
64 image processing device
65-72 image signal inputs
73-76 image signal outputs
77-84 WARP chips
85 combiner
86-89 TMDS transmitters
90-93 analogue interfaces
94 interface
VIDEO IN 1, . . . ,
VIDEO IN 8 video input signals
VIDEO OUT 1, . . . ,
VIDEO OUT 4 video output signals
Video 1, . . . ,
Video 4 video signals

The invention claimed is:

1. An image processing device comprising:
   a) a plurality of image signal inputs for receiving a respective image input signal, wherein the image input signals are unsynchronized and have a predefined bandwidth,
   b) at least one image signal output for outputting at least one image output signal,
   c) a combiner for combining the different image input signals to form the image output signal, said combiner having a predefined maximum processing bandwidth,
   d) a plurality of synchronizers, which are respectively connected downstream of the image signal inputs and which synchronize the unsynchronized image input signals, said synchronizers having a predefined maximum processing bandwidth,
   e) at least one signal splitter which is connected on an input side to at least one of the image signal inputs and on an output side to at least two of the synchronizers, wherein the at least one signal splitter splits the image input signal applied on the input side between the synchronizers connected on the output side, and
   f) a plurality of distorters or rectifiers for distorting or rectifying individual image input signals before they are combined to form the image output signal,
   wherein the distorters or rectifiers are formed by individual synchronizers and the image input signals are distorted or rectified independently of one another by in each case at least one of the synchronizers, and wherein the bandwidth of the image input signals may be greater than at least one of the processing bandwidth of the synchronizers and the processing bandwidth of the combiner.

2. The image processing device according to claim 1, wherein the combiner has a programmable or configurable combinational circuit which combines the image input signals with one another in accordance with predefined programming to form the image output signal and which can be programmed or configured via a programming interface.

3. The image processing device according to claim 2, wherein the programmable combinational circuit has a circuit selected from the group consisting of a Field Programmable Gate Array, a Programmable Array Logic and a Programmable Logic Device.

4. The image processing device according to claim 1, wherein the combiner is connected to a random access memory, the content of which defines the combination of the image input signals.

5. The image processing device according to claim 1, wherein the signal splitter is connected on the input side to a plurality of the image signal inputs and can be programmed to feed each image input signal to a respective one of the synchronizers.

6. The image processing device according to claim 5, comprising a plurality of signal splitters, wherein each of the signal splitters is connected with a respective pair of image signal inputs, wherein each of the signal splitters can be programmed individually.

7. The image processing device according to claim 1, further comprising a central clock generator which is connected on an output side to individual synchronizers.

8. The image processing device according to claim 1, further comprising an external synchronization terminal for synchronizing a plurality of image processing devices.

9. The image processing device according to claim 1, wherein the individual synchronizers in each case have a control input, via which a change of image can be triggered, wherein the control inputs of individual synchronizers are jointly connected to the combiner in order to receive a common trigger signal from the combiner.

10. The image processing device according to claim 1, wherein individual synchronizers can be configured via a respective configuration input, wherein individual configuration inputs of the synchronizers are connected to the combiner via a multiplexer.

11. The image processing device according to claim 1, further comprising eight image signal inputs and four image signal outputs.

12. The image processing device according to claim 1, wherein the image processing device is integrated on a single chip.

13. The image processing device according to claim 1, wherein the image signal output is connected to an image display device.

14. The image processing device according to claim 1, further comprising:
   a) an image signal source which provides an image signal,
   b) a signal splitter which is connected on an input side to the image signal source and which splits the image signal provided by the image signal source into a plurality of subsignals,
   c) a plurality of graphics computers which process individual subsignals, wherein individual graphics computers are connected on an input side to the signal splitter and on an output side to a respective one of the image signal inputs.

15. The image processing device according to claim 1, wherein the image processing device determines a phase shift between the image input signals and outputs the phase shift at a phase signal output.

16. An image processing system comprising a plurality of image signal sources and an image processing device according to claim 1 which is supplied by the image signal sources, wherein the phase signal output of the image processing device is connected to the image signal sources so that the image signal sources carry out rough synchronization of the image input signals fed into the image processing device, whereas the image processing device carries out fine synchronization.

17. An operating method for an image processing device, comprising the following steps:
   a) providing the image processing device of claim 1,
   b) receiving a plurality of unsynchronized image input signals via the respective image signal input,
   c) combining the image input signals by way of the combiner to form at least one image output signal,
   d) outputting the image output signal via the at least one image signal output,
   e) synchronizing the image input signals before they are combined, and
   f) distorting or rectifying the image input signals before they are combined,
   wherein the image input signals are distorted or rectified independently of one another.

18. The operating method according to claim 17, wherein the image input signals are distorted or rectified by synchronizers.

19. The operating method according to claim 17, wherein individual image input signals are in each case split between a plurality of synchronizers.

20. The operating method according to claim 19, wherein individual synchronizers are clocked together.

21. The operating method according to claim 19, wherein individual synchronizers are jointly triggered for a change of image.

22. The operating method according to claim 17, wherein the image output signal is output via an image output device.

23. The operating method according to claim 17, further comprising the following steps:
   a) determining the phase difference between the image input signals in the image processing device,
   b) roughly synchronizing the image input signals according to determined phase differences before the image input signals are fed into the image signal inputs of the image processing device,
   c) finely synchronizing the roughly synchronized image input signals after they have been fed into the image signal inputs of the image processing device.

24. The image processing device according to claim 1, wherein the signal splitter is connected on the input side to a plurality of the image signal inputs and can be programmed to split the individual image input signals in each case between a plurality of the synchronizers.

25. The image processing device according to claim 1, wherein the image processing device is integrated on a single printed circuit board.

* * * * *